Patented Mar. 23, 1937

2,074,381

UNITED STATES PATENT OFFICE 2,074,381

BROMINATED PYRANTHRONES AND METHOD OF MAKING

Maurice H. Fleysher and James Ogilvie, Buffalo, N. Y., assignors to National Aniline & Chemical Company, Inc., New York, N. Y., a corporation of New York No Drawing. Application October 24, 1934, Serial No. 749,824

10 Claims. (Cl. 260—61)

This invention relates to the preparation of brominated pyranthrones. It is particularly directed to improvements in the production of polybrom-pyranthrones by bromination of pyranthrone or a lower brompyranthrone in the presence of chlorsulfonic acid, or a mixture of chlorsulfonic and sulfuric acid, and to the polybrompyranthrone products so obtained.

It is known that pyranthrone compounds can be brominated by treatment with bromine or hydrogen bromide in the presence of chlorsulfonic acid producing brominated pyranthrones containing various percentages of bromine and presumably mono-, di-, tri-, or tetrabrompyranthrones. The polybrom-pyranthrones containing above 35% of bromine thus obtained do not readily yield clear solutions with alkaline hydrosulfites and hence tend to form cloudy or "muddy" dye baths. This is objectionable in dyeing or printing textile fibers with such polybrom-pyranthrones, since the fibers are not dyed or printed the full strength or shade corresponding to the amount of dye employed.

It has now been found that if the bromination of a pyranthrone compound in a reaction medium comprising chlorsulfonic acid and a halogenation catalyst is carried out while having present a boron compound soluble in the reaction medium and in particular an oxygen-containing boron compound, polybrom-pyranthrones can be obtained which are free from this objection. The oxygen-containing boron compounds, e. g. boron oxides, boric acids, and metal borates are designated generically herein as borates. Brompyranthrones containing 35 to 44% bromine may be prepared in accordance with the present invention which are readily soluble in an alkaline hydrosulfite solution giving a clear dye bath from which the dye does not tend to separate out or precipitate. Dyeings or prints of full strength, therefore, may be obtained from these brompyranthrones and the dyeings moreover are fast to soaping and rubbing. The higher brompyranthrones of the present invention contain from about 35% to about 44% of bromine and from about 0.3% to 1.5% of chlorine, and the preferred products contain from about 37% to about 40% of bromine and from 0.3% to 1.3% of chlorine.

Our invention is especially applicable to the bromination of pyranthrone or the lower brompyranthrones, i. e. those containing less than 35% of bromine, by treatment with bromine in the presence of chlorsulfonic acid and a halogenation catalyst, and is particularly applicable to the bromination of such a pyranthrone by treatment with bromine in the presence of a mixture or chlorsulfonic acid and sulfuric acid monohydrate using iodine or an equivalent material as catalyst.

As examples of boron compounds which may be included in the reaction mixture in order to accomplish the benefits of our invention, there may be mentioned boric acids, boric anhydride, and the salts of boric acids (for example, borax or sodium metaborate). Preferably an anhydrous boron compound is employed, such as boric anhydride or an anhydrous metal borate.

In the bromination of pyranthrone it is not necessary that the boron compound be present during the early stages of the bromination, in which the lower brompyranthrones are formed, provided the bromination of the lower brompyranthrones to the more highly brominated derivatives is carried out with the aid of the boron compound. Further, it is not necessary that the theoretically required amount of bromine be used, inasmuch as hydrogen bromide formed in the reaction acts as a brominating agent for the pyranthrone compound in the presence of chlorsulfonic acid.

The following example illustrates the invention. The proportions of reagents are expressed in parts by weight.

Example: To a well-stirred solution of 80 parts of pyranthrone dissolved in 400 parts of sulfuric acid monohydrate ($H_2SO_4$) maintained at a temperature between 25° and 45° C., there are added 25 parts of boric anhydride ($B_2O_3$). The resultant intimate mixture is maintained at between 20° C. and 25° C. and 640 parts of chlorsulfonic acid are slowly added. The addition should be regulated carefully to avoid excessive foaming. About 7 parts of iodine are added and the mixture is stirred until a homogeneous mass is obtained. 60 parts of bromine are then introduced causing the temperature of the mixture to rise to between 41° and 45° C. The mixture is agitated at this temperature for about 15 hours, then slowly run into 6000 parts of water, the temperature of which is about 85° C. The resultant mixture is further diluted by the addition of 6000 parts of cold water and the dyestuff is filtered off and washed with cold water until acid-free. It is then washed with a weak sodium carbonate solution (0.1% $Na_2CO_3$) and finally with hot water until alkali-free.

The dyestuff obtained in the above manner, after drying and pulverizing, is a dark brown powder of metallic lustre, which contains between 37% and 40% of bromine and a small amount, 0.3 to 1.5% of chlorine. It is soluble in concentrated sulfuric acid giving a blue solution, and in warm trichlorbenzene giving a yellow solution. It is soluble in aqueous, alkaline hydrosulfite giving a magenta-colored dye bath from which, upon subsequent development, cotton goods may be dyed a fast reddish-orange.

It will be realized by those skilled in the art that variations may be made in the details of the foregoing example without departing from the scope of the invention.

Thus the temperature during bromination may be considerably lower than that specified in the example, but lower temperatures require a correspondingly lengthened reaction period. For instance, if the temperature is maintained at 25° to 30° C. during bromination, the above bromination requires 36 to 45 hours for completion. In order to accelerate the bromination, it is therefore desirable to employ the higher temperatures. However, temperatures substantially above 50° C. are preferably avoided, as the shades of the dyeings tend to become duller, unless loss of bromine does occur, and more highly-brominated products which give cloudy dye baths are likely to be produced.

Instead of employing 25 parts of boric anhydride in the above example, 32 parts of dry metaboric acid ($H_2BO_3$) may be employed, giving a similar result. In this case, however, especial care should be observed to avoid excessive foaming.

The amount of bromine used may be varied. If less bromine is used than in the above example, products which dye with yellower shades are obtained, whereas with more bromine products which dye with redder shades are obtained. However, if more bromine is employed than will produce a product containing about 44% of bromine (based on the weight of the brominated pyranthrone and corresponding to about a tetrabrompyranthrone), the resulting products may yield cloudy dye baths.

We claim:

1. In the bromination of a pyranthrone nucleus, the step which comprises effecting the bromination in a reaction medium including a boron compound dissolved therein.

2. In the bromination of a member of the group consisting of pyranthrone and lower brompyranthrones, the step which comprises effecting the bromination in a reaction medium including chlorsulfonic acid and a boron compound dissolved therein.

3. The method of brominating a member of the group consisting of pyranthrone and lower brompyrathrones, which comprises subjecting the pyranthrone to the action of bromine in a reaction medium comprising chlorsulfonic acid, a halogenation catalyst, and a boron compound dissolved therein.

4. In the bromination of a member of the group consisting of pyranthrone and lower brompyranthrones, the improvement which comprises mixing the pyranthrone with chlorsulfonic acid, a halogenation catalyst, and a borate, and brominating the pyranthrone in the resultant mixture.

5. The method of producing a brompyranthrone containing from about 35% to about 44% bromine, which comprises brominating a lower brompyranthrone in a reaction medium comprising chlorsulfonic acid, a halogenation catalyst, and a borate.

6. The method of brominating a member of the group consisting of pyranthrone and lower brompyranthrones, which comprises subjecting the pyranthrone to the action of bromine in a reaction medium comprising chlorsulfonic acid, sulfuric acid, iodine, and an anhydrous boron compound dissolved therein.

7. The method of producing a polybrompyranthrone, which comprises brominating a lower brompyranthrone at a temperature below 50° C. in a mixture comprising sulfuric acid, chlorsulfonic acid, a halogenation catalyst, and boric anhydride.

8. The method of making a brompyranthrone containing from about 35% to about 44% of bromine, which comprises treating a pyranthrone containing less than 35% of bromine with bromine at a temperature between 25° C. and 50° C. in a solution of sulfuric acid and chlorsulfonic acid containing iodine and boric anhydride.

9. A brompyranthrone containing from about 35% to about 44% bromine and from about 0.3% to about 1.5% chlorine, being obtainable by the process of claim 6, and being a dark brown powder of metallic lustre soluble in aqueous alkaline hydrosulfite to yield a clear solution.

10. A brompyranthrone containing between 37% and 40% of bromine and between 0.3% and 1.5% of chlorine, said brompyranthrone being a dark brown powder of metallic lustre soluble in aqueous alkaline hydrosulfite to yield a clear solution.

MAURICE H. FLEYSHER.
JAMES OGILVIE.